United States Patent [19]

Kochesky et al.

[11] Patent Number: 5,284,704
[45] Date of Patent: Feb. 8, 1994

[54] NON-WOVEN TEXTILE ARTICLES COMPRISING BICOMPONENT FIBERS AND METHOD OF MANUFACTURE

[75] Inventors: Francis F. Kochesky, Newburgh; Bryan F. Paschall, New Windsor, both of N.Y.

[73] Assignee: American Felt & Filter Company, Newburgh, N.Y.

[21] Appl. No.: 821,488

[22] Filed: Jan. 15, 1992

[51] Int. Cl.$^5$ .................. B01D 39/16; D04H 1/48; D04H 1/54; H01M 2/16
[52] U.S. Cl. ........................... 428/296; 28/112; 55/528; 55/DIG. 28; 55/DIG. 35; 204/235; 204/238; 204/249; 204/264; 401/139; 429/249
[58] Field of Search ................ 428/296; 28/112; 55/528, DIG. 28, DIG. 35; 401/139, 430; 429/249

[56] References Cited

U.S. PATENT DOCUMENTS

| | | | |
|---|---|---|---|
| 3,551,271 | 12/1970 | Thomas et al. | 428/296 |
| 3,595,731 | 7/1971 | Davies et al. | 428/296 |
| 3,616,160 | 10/1971 | Wincklhofer | 428/296 |
| 3,616,167 | 10/1971 | Gosden | 428/296 |
| 3,620,892 | 11/1971 | Wicklhofer | 428/296 |
| 3,639,195 | 2/1972 | Sanders | 428/296 |
| 4,141,460 | 2/1979 | Stanistreet | 428/296 |
| 4,722,857 | 2/1988 | Tomioka | 428/296 |
| 4,732,809 | 3/1988 | Harris | 428/296 |
| 4,770,925 | 9/1988 | Uchikawa | 428/296 |
| 4,795,668 | 1/1989 | Krueger | 428/296 |

Primary Examiner—James C. Cannon
Attorney, Agent, or Firm—Martin Smolowitz

[57] ABSTRACT

Fibers comprising 10 to 100% of bicomponent fibers, composed of a core polymer covered by a sheath polymer, are heated to a temperature between the softening point and the melting point of the sheath polymer for 5 seconds to 5 minutes at a pressure of 0 to 2000 psi until the fibers are bonded together. The products are used for drive belts and seals, nib felts for marking pens, filter cloths for plate and frame filters, filtration cartridges, stamp pad ink reservoirs, and battery separators.

19 Claims, 1 Drawing Sheet

NON-WOVEN TEXTILE ARTICLES COMPRISING BICOMPONENT FIBERS AND METHOD OF MANUFACTURE

BACKGROUND OF THE INVENTION

This invention relates to the field of non-woven textile materials and articles made therefrom.

Current non-woven textile technology consists of dry and wet processing varied to control the properties of the end product. Wool felts cannot be made by dry processes if the felting properties of wool are to be used. Needled felts are limited in their hardness, rigidity and other properties, unless chemical and/or wet processes are added, for example through the use of impregnants. The continued development of new types of synthetic fibers has increased the range of properties of synthetic fiber needled felts, resulting in the displacement of wool felts from many areas of use. Among these areas are: marking pen nibs or tips, resin bonded filters, plate and frame filter sheets, marking stamp pad reservoirs and battery separator media.

Prior art for the modification of these and other types of non-woven textile materials has included the post-manufacture treatment of the textile with a variety of chemical materials, such as lattices, resins, plastics and the like, and has included also laminations, coatings and mechanical finishes. Marking pen nib felts are normally treated with formulations of melamine-formaldehyde to enhance rigidity and wear resistance, while retaining the ability to allow ink to flow freely through the fiber interstices. Phenolic complex resins continue to be used to produce rigid fibrous filter cartridges capable of withstanding pressures exceeding 100 psi. Plate and frame cloths have been coated with various resins (viz., acrylic, urethane, etc.) to provide a clean cake release from the surface. Stamp pad felts have been treated with wetting agents to promote ink leveling, and have been laminated to inert materials to provide rigidity and reduce cost. Battery separators have been produced which accommodate the special chemical requirements associated with advanced battery technology.

In general, these modifications have required wet processing and the use of chemical materials which are increasingly becoming categorized as hazardous or unsafe. Therefore, increased environmental concerns have vastly reduced the range of materials which can safely be used to modify the basic fibrous structures of non-woven textiles.

Within the last decade, certain specialty synthetic fibers identified generically as "bicomponent" or "bico" fibers have been produced. In general, these consist of, but are not limited to, two varieties of a single polymer type. Structurally, they consist of a core polymer and a sheath polymer. Creation of these new fibers has permitted the redevelopment of some products formerly requiring the post-treatment of basic non-woven structures, through a re-alignment of customary manufacturing techniques, adapted to the use of these fibers. Because the core and sheath polymers are often varieties of the same polymer, they retain their polymeric identity, but have different melting points. This feature permits their use as bonding agents. While bondable fibers have existed for a considerable period of time, their melting points rendered them unusable for many purposes, or their chemical properties excluded them from important uses.

A non-woven melded fabric, known under the trademark "Cambrelle" is composed of bico fibers. Upon heating to the melting point of the sheath polymer, the fibers soften and unite to form a fabric, which is used for carpet backing, road reinforcement, upholstery, interlinings, tablecloths and other household applications.

SUMMARY OF THE INVENTION

The present invention relates to a method for producing a non-woven fabric from staple fibers containing at least 10% of bicomponent fibers by the use of heat alone or heat and pressure over a period of time determined by the properties desired in the final product. It is not intended to cover materials in which the bicomponent fibers are accidentally present due to the use of recycled/reused fibers or in which they represent a temporary substitute for a preferred other fiber.

The invention also relates to the products obtained by the method and articles made from these products, e.g. nib felts from which nibs for marking pens can be cut, clothes dryer drive belts and seals, pleated cartridges for filtration, plate and frame process filter cloths, prefilters for individual respirator mask filters, stamp-pad ink reservoirs, fuel-cell or battery separators.

DETAILED DESCRIPTION

In the present invention, the bico fibers are oriented or aligned in the desired fashion, may or may not be needled, and then are subjected to an appropriate combination of heat, pressure, and time, to produce new non-woven fibrous structures having controllable pore-size and distribution, proportion and alignment. The cited parameters of heat, pressure and time offer useful means of modifying the properties in the finished products as follows:

(1) The heat, or temperature, controls the degree of softening of the sheath polymer of the bico fiber.

Figure 2:
FIG. 2 is a cross-sectional view of a bundle of bicomponent fibers heated under low pressure.
Figure 3:
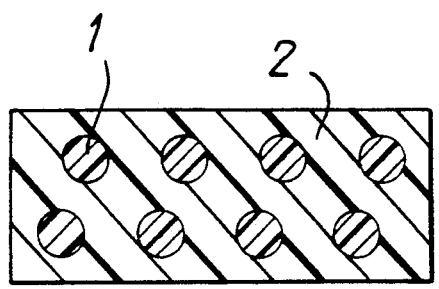
FIG. 3 is a cross-sectional view of a bundle of bicomponent fibers heated under high pressure.

(2) The pressure controls the amount of merging that takes place between two or more bico fiber sheaths as illustrated by FIGS. 2 and 3.

(3) The time controls the degree of penetration of the heat through the fibrous mass, which is self-insulating. Thus a high temperature, short dwell time can produce a slick surface, while a low temperature, long dwell time would produce a rigid mass of the same structure.

Figure 1:
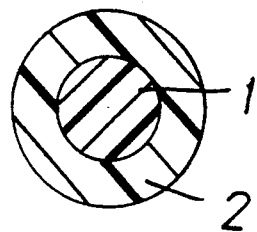
FIG. 1 is a cross-sectional view of a bicomponent fiber.

The pressure used in the process according to the invention can vary between 0 and 2000 psi for a period of time from 5 sec. to 5 min. The temperature will vary depending upon the particular composition of the bicomponent fibers. These consist of a core polymer 1 surrounded by a sheath polymer 2 as shown in FIG. 1. The melting point of useful core polymers is about 250°–400° F. and the melting point of useful sheath polymers is about 150°–350° F.

Since the sheath and core melting points differ by greater or lesser amounts depending on the polymers used, different examples of generically similar fibers can be selected to achieve specific results. For example, there are several varieties of polyester bico fibers from various producers, in which the sheath polymers offer melting points ranging from well under 260° F. to well above 325° F. Since the molecular structure of these polymers controls both their rigidity and their melting points, it is possible to control the rigidity of non-woven fabrics simply by choosing a particular polyester bico fiber and the thermal/pressure/time processing parameters, thus eliminating entirely any subsequent chemical or resinous treatment. In general, it is preferred to select the lowest melting point consistent with the end product, since undesirable differential shrinkage can occur between the sheath and the core polymers, as the temperature of full melt for the sheath is approached.

In general, this invention therefore relates to, but is not limited to, the use of polyester bicomponent fibers in which the core polymer melting point exceeds the sheath polymer melting point by at least 40° F., but ideally as great a differential as possible.

As an example of a preferred embodiment, felt nibs for marking pens were formed by using 3 denier bico fibers of 100% polyester, needled thoroughly to 34–38 oz. per sq. yd. and 3/16 inch thick, pressed to ⅛ inch in thickness and heated at 200° F. for 3 min. at 0 psi, then die cut to shape.

Materials have also been made, however, and are included in this invention, since the technology is the same, utilizing bico fibers consisting of, for example:

| CORE | SHEATH |
| --- | --- |
| polypropylene | polyethylene |
| high densty polypropylene | low density polypropylene |
| nylon | polyester |
| nylon | polypropylene |

The bico fibers are usually limited to lower range deniers, such as 1.5, 3.0 and 6.0 but higher denier fibers have been experimentally produced.

Figure 4:
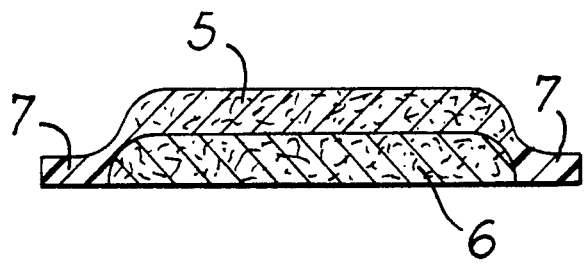
FIG. 4 is a perspective view of a filter cartridge having a pleated wrap of a non-woven fabric containing bicomponent fibers.
Figure 5:
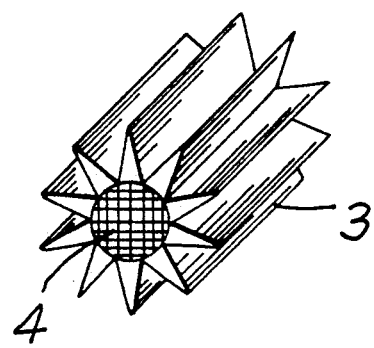
FIG. 5 is a cross-sectional view of a prefilter made of a non-woven fabric containing bicomponent fibers bonded to a filter.

In addition to materials utilizing 100% bico fibers, non-woven materials according to the invention have been made using blends of bico fibers in admixture with one or more other fibers, such as rayon, nylon, acrylics, or wool. For example, a wool/polyester and polyester bico blend was used for a clothes dryer drive belt and seal. This provided the stiffness needed for simple installation of the belt, which softened in use, such that undesirable noise of previous belts was all but eliminated. Another example is found in bico felt nibs for marking pens, in which 20% of the blend was a viscose rayon fiber, which permitted rapid wetting of the nib with a water-based ink, without requiring treatment with a wetting agent. An additional example is a lightweight porous sheet prepared in roll form, subsequently reheated and pleated in standard pleating machinery, with the pleated material 3 then wrapped around an open screen-like core 4, to form a pleated cartridge for filtration as shown in FIG. 4. A further example is the preparation of a bico prefilter material for individual respirator mask filters, in which the bico prefilter material 5 can be cut and bonded to the final respirator material 6 in a single operation using a heated die forming a fused bico edge 7 (FIG. 5). All of the above were produced by heating at a pressure of 0 to 2000 psi for a time period of 5 sec. to 5 min.

Additional variations may be made without departing from the scope of the invention defined by the following claims.

We claim:

1. A method of forming a non-woven fabric from bicomponent fibers having a polyester core polymer surrounded by a polyester sheath polymer comprising the steps of forming a sheet from a mass of fibers comprising from 10 to 100% of said bicomponent polyester fibers, needling said sheet, and heating said needled sheet to a temperature between the softening point and the melting point of the sheath polymer for a period of time from 5 sec. to 5 min. at a pressure of 0 to 2000 psi until the fibers are bonded together.

2. The method according to claim 1 wherein the temperature is about 150° to 350° F.

3. The method according to claim 2 wherein said mass of fibers comprises 100% bicomponent fibers and said sheet is needled to 34–38 oz. per sq. yd. and then heated to 200° F. for 3 min. at 0 psi.

4. The method according to claim 1 wherein the core polymer melting point exceeds the sheath polymer melting point by at least 40° F.

5. A non-woven fabric prepared by the method of claim 1.

6. A non-woven fabric prepared by the method of claim 1, wherein the mass of fibers comprises a blend of the bicomponent polyester fibers and other fibers selected from the group consisting of rayon, nylon, acrylic and wool fibers.

7. The non-woven fabric according to claim 6 wherein the other fibers are wool fibers.

8. A drive belt comprised of the non-woven fabric of claim 7.

9. The non-woven fabric according to claim 6 wherein the blend comprises 20% viscose rayon fibers and 80% polyester bicomponent fibers.

10. Marking pen nibs made by die-cutting the non-woven fabric of claim 9.

11. Marking pen nibs made by die-cutting the non-woven fabric prepared by the method of claim 1 and comprising 40 to 100% of bicomponent fibers.

12. Marking pen nibs made by die-cutting the non-woven fabric prepared by the method of claim 3.

13. A non-woven fabric prepared by the method of claim 1, wherein the sheath polymer has a melting point of about 260°–325° F.

14. The non-woven fabric according to claim 13, wherein the fibers have a denier from 1.5 to 6.0.

15. The method of claim 3 wherein the fibers are 3 denier, the needled sheet is 3/16 inch thick and the needled sheet is pressed to ⅛ inch thick before heating.

16. A non-woven fabric prepared by the method of claim 15.

17. Marking pen nibs made by die-cutting the non-woven fabric of claim 16.

18. A non-woven fabric prepared by the method of claim 4.

19. Marking pen nibs made by die-cutting the non-woven fabric of claim 18.

* * * * *